United States Patent
Hammer et al.

(10) Patent No.: US 10,257,248 B2
(45) Date of Patent: Apr. 9, 2019

(54) SCALABLE AND ITERATIVE DEEP PACKET INSPECTION FOR COMMUNICATIONS NETWORKS

(71) Applicant: Yaana Technologies, Inc., Milpitas, CA (US)

(72) Inventors: Michael P. Hammer, Reston, VA (US); David Grootwassink, Safety Harbor, FL (US); Rajesh Puri, Fremont, CA (US)

(*) Notice: Subject to any disclaimer, the term of this patent is extended or adjusted under 35 U.S.C. 154(b) by 16 days.

(21) Appl. No.: 15/143,463

(22) Filed: Apr. 29, 2016

(65) Prior Publication Data
US 2016/0323178 A1 Nov. 3, 2016

Related U.S. Application Data

(60) Provisional application No. 62/154,634, filed on Apr. 29, 2015.

(51) Int. Cl.
*H04L 12/24* (2006.01)
*H04L 29/06* (2006.01)
(Continued)

(52) U.S. Cl.
CPC .......... *H04L 65/608* (2013.01); *H04L 43/026* (2013.01); *H04L 63/306* (2013.01); *H04L 65/1016* (2013.01); *H04W 28/02* (2013.01)

(58) Field of Classification Search
CPC . H04L 65/608; H04L 63/306; H04L 65/1016; H04L 43/026; H04L 45/22; H04W 28/02
See application file for complete search history.

(56) References Cited

U.S. PATENT DOCUMENTS 6,266,704 B1 7/2001 Reed et al.
6,377,688 B1 4/2002 Numao
(Continued)

FOREIGN PATENT DOCUMENTS

CN 103838593 A 6/2014
CN 104869181 A 8/2015
(Continued)

OTHER PUBLICATIONS

Antopolis, Sophia, Interface for Warrant information Output from LI34 Q&D LI Agnostic; vol. LI No. Vo.07, Jan. 28, 2014.
(Continued)

*Primary Examiner* — Lan-Huong Truong
(74) *Attorney, Agent, or Firm* — Steptoe & Johnson LLP

(57) ABSTRACT

Systems and methods for scalable and iterative deep packet inspection for communication networks are disclosed. According to one embodiment, a system comprises a home network and a visitor network in communication with the home network over an Internetwork packet exchange. The visitor network may have an intercept area with an intercept probe, a local packet data network gateway (PGW) and a local proxy-call session control function (P-CSCF). The system further includes a diameter edge agent that monitors signaling traffic in the visitor network passing to and from the home network. The system also has a targeting system in communication with the diameter edge agent that redirects the signaling traffic from the home PGW to the visiting PGW.

14 Claims, 2 Drawing Sheets

(51) Int. Cl.
*H04W 28/02* (2009.01)
*H04L 12/26* (2006.01)

(56) References Cited

U.S. PATENT DOCUMENTS

| | | |
|---|---|---|
| 6,529,441 B1 | 3/2003 | Cummins et al. |
| 6,574,609 B1 | 6/2003 | Downs et al. |
| 6,765,892 B1 | 7/2004 | Leung et al. |
| 6,785,740 B1 | 8/2004 | Yoneda et al. |
| 6,990,352 B2 | 1/2006 | Pyhalammi et al. |
| 7,082,532 B1 | 7/2006 | Vick et al. |
| 7,146,009 B2 | 12/2006 | Andivahis et al. |
| 7,383,433 B2 | 6/2008 | Yeager et al. |
| 7,536,464 B1 | 5/2009 | Dommety et al. |
| 7,561,517 B2 | 7/2009 | Klinker et al. |
| 7,620,033 B2 | 11/2009 | Chu et al. |
| 7,634,522 B1 | 12/2009 | Carter et al. |
| 7,653,815 B2 | 1/2010 | Godfrey et al. |
| 7,739,496 B2 | 6/2010 | Jacobs |
| 7,783,901 B2 | 8/2010 | Carrico et al. |
| 7,796,760 B2 | 9/2010 | Brettle et al. |
| 7,809,943 B2 | 10/2010 | Seidel et al. |
| 7,849,053 B2 | 12/2010 | Wolff et al. |
| 7,961,663 B2 | 6/2011 | Lin |
| 7,966,000 B2 | 6/2011 | Semple et al. |
| 7,969,968 B2 | 6/2011 | De Luca et al. |
| 7,991,158 B2 | 8/2011 | Narendra et al. |
| 8,068,606 B2 | 11/2011 | Schneider |
| 8,149,994 B2 | 4/2012 | Yoon et al. |
| 8,195,147 B2 | 6/2012 | Bonnet et al. |
| 8,218,490 B2 | 7/2012 | Rydnell et al. |
| 8,264,989 B2 | 9/2012 | Suzuki |
| 8,275,891 B2 | 9/2012 | Yasrebi et al. |
| 8,295,830 B1 * | 10/2012 | Faccin .................... H04W 8/04 370/331 |
| 8,311,956 B2 | 11/2012 | Sen et al. |
| 8,363,664 B2 | 1/2013 | Ramankutty et al. |
| 8,452,957 B2 | 5/2013 | Pourzandi et al. |
| 8,472,384 B2 | 6/2013 | Shu et al. |
| 8,516,244 B2 | 8/2013 | Waters |
| 8,560,835 B2 | 10/2013 | Cheng et al. |
| 8,599,747 B1 | 12/2013 | Saleem et al. |
| 8,634,810 B2 | 1/2014 | Barkie et al. |
| 8,646,063 B2 | 2/2014 | Dowlatkhah |
| 8,667,182 B2 | 3/2014 | Huang |
| 8,667,570 B2 | 3/2014 | Bari |
| 8,677,148 B2 | 3/2014 | O'Hare et al. |
| 8,713,320 B2 | 4/2014 | Xu et al. |
| 8,738,898 B2 | 5/2014 | Herwono et al. |
| 8,738,916 B2 | 5/2014 | Klassen et al. |
| 8,755,342 B2 | 6/2014 | Iyer et al. |
| 8,755,392 B2 | 6/2014 | Traversat et al. |
| 8,811,401 B2 | 8/2014 | Stroud et al. |
| 8,831,227 B2 | 9/2014 | Ge et al. |
| 8,867,339 B2 | 10/2014 | Hu |
| 8,891,407 B2 | 11/2014 | Collins et al. |
| 8,924,574 B2 | 12/2014 | Alex et al. |
| 8,996,854 B2 | 3/2015 | Hamalainen |
| 9,013,992 B2 | 4/2015 | Perkins |
| 9,036,540 B2 | 5/2015 | Bu et al. |
| 9,047,107 B2 | 6/2015 | Walsh et al. |
| 9,172,703 B2 | 10/2015 | Chaturvedi et al. |
| 9,191,803 B2 | 11/2015 | Patel et al. |
| 9,225,647 B2 | 12/2015 | Manuguri et al. |
| 9,230,001 B2 | 1/2016 | Magdon-Ismail et al. |
| 9,325,495 B2 | 4/2016 | Roberts |
| 9,379,891 B2 | 6/2016 | Yoon et al. |
| 9,383,969 B2 | 7/2016 | Van Der Sluis et al. |
| 9,432,258 B2 * | 8/2016 | Van der Merwe .... H04L 41/083 |
| 9,473,574 B2 | 10/2016 | Vandwalle et al. |
| 9,712,421 B2 | 7/2017 | Dolson et al. |
| 9,736,111 B2 | 8/2017 | Lopez Da Silva et al. |
| 9,860,195 B2 | 1/2018 | Javali et al. |
| 9,876,759 B2 | 1/2018 | Ghai et al. |
| 2002/0156987 A1 | 10/2002 | Gajjar et al. |
| 2002/0166056 A1 | 11/2002 | Johnson et al. |
| 2003/0070070 A1 | 4/2003 | Yeager et al. |
| 2003/0081607 A1 | 5/2003 | Kavanagh |
| 2003/0133443 A1 * | 7/2003 | Klinker .................... H04L 29/06 370/353 |
| 2003/0147536 A1 | 8/2003 | Andivahis et al. |
| 2004/0034776 A1 | 2/2004 | Fernando et al. |
| 2004/0034778 A1 | 2/2004 | Celik |
| 2004/0042416 A1 | 3/2004 | Ngo et al. |
| 2004/0064688 A1 | 4/2004 | Jacobs |
| 2004/0067761 A1 | 4/2004 | Pyhalammi et al. |
| 2004/0083297 A1 | 4/2004 | Gazzetta et al. |
| 2004/0196978 A1 | 10/2004 | Godfrey et al. |
| 2004/0213179 A1 | 10/2004 | Lundin et al. |
| 2004/0264405 A1 | 12/2004 | MacGregor Scobbie |
| 2004/0266397 A1 | 12/2004 | Smith et al. |
| 2005/0053068 A1 | 3/2005 | Toth et al. |
| 2005/0094651 A1 * | 5/2005 | Lutz .................... H04M 3/2281 370/401 |
| 2005/0120160 A1 | 6/2005 | Plouffe et al. |
| 2005/0259637 A1 | 11/2005 | Chu et al. |
| 2006/0046714 A1 * | 3/2006 | Kalavade ................ H04M 3/54 455/428 |
| 2006/0059091 A1 | 3/2006 | Wang et al. |
| 2006/0204007 A1 | 9/2006 | Doetzkies et al. |
| 2006/0224883 A1 | 10/2006 | Khosravi et al. |
| 2006/0236092 A1 | 10/2006 | Hamalainen |
| 2007/0006296 A1 | 1/2007 | Nakhjiri et al. |
| 2007/0087756 A1 | 4/2007 | Hoffberg et al. |
| 2007/0100981 A1 * | 5/2007 | Adamczyk .............. H04L 69/18 709/223 |
| 2007/0156632 A1 | 7/2007 | Wolff et al. |
| 2008/0076425 A1 | 3/2008 | Khetawat et al. |
| 2008/0089239 A1 | 4/2008 | Todd et al. |
| 2008/0101345 A1 | 5/2008 | Suzuki |
| 2008/0107096 A1 | 5/2008 | Huang |
| 2008/0137825 A1 | 6/2008 | Yoon et al. |
| 2008/0155278 A1 | 6/2008 | Carrico et al. |
| 2008/0212782 A1 | 9/2008 | Brettle et al. |
| 2008/0279381 A1 | 11/2008 | Narendra et al. |
| 2008/0285452 A1 | 11/2008 | Oran |
| 2009/0060175 A1 | 3/2009 | Schneider |
| 2009/0088147 A1 | 4/2009 | Bu et al. |
| 2009/0259532 A1 | 10/2009 | Bergstraesser et al. |
| 2009/0287922 A1 | 11/2009 | Herwono et al. |
| 2009/0305688 A1 | 12/2009 | Bonnet et al. |
| 2010/0039993 A1 | 2/2010 | Ramankutty et al. |
| 2010/0086119 A1 * | 4/2010 | De Luca .............. H04M 3/2281 379/213.01 |
| 2010/0125855 A1 | 5/2010 | Ferwerda et al. |
| 2010/0174907 A1 | 7/2010 | Semple et al. |
| 2010/0246500 A1 | 9/2010 | Rydnell et al. |
| 2011/0016399 A1 | 1/2011 | Yasrebi et al. |
| 2011/0040706 A1 | 2/2011 | Sen et al. |
| 2011/0040858 A1 | 2/2011 | Gum |
| 2011/0069663 A1 | 3/2011 | Shu et al. |
| 2011/0075675 A1 | 3/2011 | Koodi et al. |
| 2011/0141947 A1 * | 6/2011 | Li ...................... H04M 3/2281 370/259 |
| 2011/0154022 A1 | 6/2011 | Cheng et al. |
| 2011/0170545 A1 | 7/2011 | Zheng et al. |
| 2011/0182183 A1 | 7/2011 | Perkins |
| 2011/0191469 A1 | 8/2011 | Oran |
| 2011/0216646 A1 | 9/2011 | Flinta et al. |
| 2011/0219123 A1 | 9/2011 | Yang et al. |
| 2011/0264906 A1 | 10/2011 | Pourzandi et al. |
| 2011/0268121 A1 | 11/2011 | Karino |
| 2012/0084288 A1 | 4/2012 | Abdul-Razzak et al. |
| 2012/0120788 A1 | 5/2012 | Hu |
| 2012/0191860 A1 | 7/2012 | Traversat et al. |
| 2012/0198241 A1 | 8/2012 | O'Hare et al. |
| 2012/0297087 A1 | 11/2012 | Humble et al. |
| 2012/0314854 A1 | 12/2012 | Waters |
| 2012/0331298 A1 | 12/2012 | Xu et al. |
| 2013/0042112 A1 | 2/2013 | Spector |
| 2013/0080586 A1 | 3/2013 | Attanasio |
| 2013/0084896 A1 | 4/2013 | Barkie et al. |
| 2013/0091526 A1 | 4/2013 | Iyer et al. |
| 2013/0128886 A1 | 5/2013 | Shah |

(56) References Cited

U.S. PATENT DOCUMENTS

| | | |
|---|---|---|
| 2013/0132501 A1 | 5/2013 | Vandwalle et al. |
| 2013/0137399 A1 | 5/2013 | Bari |
| 2013/0159715 A1 | 6/2013 | Klassen et al. |
| 2013/0160080 A1 | 6/2013 | Shin et al. |
| 2013/0160097 A1 | 6/2013 | Dowlatkhah |
| 2013/0250771 A1 | 9/2013 | Yu et al. |
| 2013/0254853 A1 | 9/2013 | Chaturvedi et al. |
| 2013/0283060 A1 | 10/2013 | Kulkarni et al. |
| 2013/0301627 A1 | 11/2013 | Chen et al. |
| 2013/0329725 A1 | 12/2013 | Nakil et al. |
| 2013/0343388 A1 | 12/2013 | Stroud et al. |
| 2013/0346629 A1 | 12/2013 | Wang et al. |
| 2014/0032753 A1 | 1/2014 | Watanabe et al. |
| 2014/0040338 A1 | 2/2014 | Van Der Sluis et al. |
| 2014/0040975 A1 | 2/2014 | Raleigh et al. |
| 2014/0047439 A1 | 2/2014 | Levy et al. |
| 2014/0129728 A1 | 5/2014 | Alex et al. |
| 2014/0181933 A1 | 6/2014 | Sanjeev et al. |
| 2014/0192976 A1 | 7/2014 | Yoon et al. |
| 2014/0226478 A1 | 8/2014 | Manuguri et al. |
| 2014/0241169 A1* | 8/2014 | Collins ............... H04W 24/02 370/242 |
| 2014/0245014 A1 | 8/2014 | Tuck et al. |
| 2014/0274000 A1 | 9/2014 | Gosselin et al. |
| 2014/0286337 A1 | 9/2014 | Dolson et al. |
| 2014/0301258 A1* | 10/2014 | Belghoul .......... H04W 52/0209 370/311 |
| 2014/0331175 A1 | 11/2014 | Mesguich Havilio et al. |
| 2014/0344908 A1 | 11/2014 | Rizzo et al. |
| 2014/0348044 A1 | 11/2014 | Narayanan et al. |
| 2014/0355520 A1 | 12/2014 | Wallis |
| 2015/0058876 A1 | 2/2015 | Gasnier |
| 2015/0065125 A1* | 3/2015 | Patel ..................... H04W 8/12 455/433 |
| 2015/0139230 A1 | 5/2015 | Zha et al. |
| 2015/0148007 A1 | 5/2015 | Mitchell et al. |
| 2015/0188919 A1 | 7/2015 | Belton, Jr. et al. |
| 2015/0256338 A1 | 9/2015 | Roberts |
| 2015/0281940 A1 | 10/2015 | Yu et al. |
| 2015/0304275 A1 | 10/2015 | Ghai et al. |
| 2015/0372973 A1 | 12/2015 | Lopez Da Silva et al. |
| 2016/0072766 A1 | 3/2016 | Jain et al. |
| 2016/0359798 A1 | 12/2016 | Choquette et al. |
| 2017/0195256 A1 | 7/2017 | Javali et al. |
| 2017/0250944 A1 | 8/2017 | Hong |
| 2017/0373961 A1 | 12/2017 | Dolson et al. |
| 2018/0034770 A1 | 2/2018 | Rajagopalan et al. |

FOREIGN PATENT DOCUMENTS

| | | |
|---|---|---|
| EP | 1587249 A1 | 10/2005 |
| EP | 1837815 A1 | 9/2007 |
| EP | 1993257 A1 | 11/2008 |
| WO | 2007004938 A1 | 1/2007 |
| WO | 2009103340 A1 | 8/2009 |
| WO | 2013035051 A1 | 3/2013 |
| WO | 2014018425 A1 | 1/2014 |
| WO | 2015066930 A1 | 5/2015 |

OTHER PUBLICATIONS

International Search Report dated May 21, 2015 in corresponding PCT Application No. PCT/US2015/15490 filed Feb. 11, 2015, inventor Puri, Rajesh et al.

Antopolis, Sophia, Lawful Interception (LI); Retained Data; Requirements of Law Enforcement Agencies for handling Retained Data, ETSI Draft; Jan. 27, 2009.

Extended European Search Report dated Feb. 16, 2018 in corresponding EP Application No. 15749222.4 filed Sep. 12, 2016, inventor Grootwassink, David et al.

Antopolis, Sophia, Universal Mobile Telecommunications System (UMTS)LTE; 3G security; Lawful Interception and architechure and functions, version 10.4.0., Jun. 1, 2011.

International Search Report dated Jul. 8, 2015 in corresponding PCT Application No. PCT/US2015/016961 filed Feb. 20, 2015. inventor, Grootwassink, David et al.

International Search Report dated Oct. 30, 2015, issued in International Application No. PCT/US2015/023626 filed Mar. 31, 2015, inventor, Grootwassink, David et al.

International Search Report dated Feb. 2, 2016, issued in International Application No. PCT/US2015/054957 filed Oct. 9, 2015, inventor Hammer, Michael et al.

International Search Report dated Jan. 28, 2016, issued in International Application No. PCT/US2015/061976 filed Nov. 20, 2015, inventor Puri, Rajesh et al.

International Search Report dated Jun. 22, 2015, issued in International Application No. PCT/US2015/20755 filed Mar. 16, 2015, inventor Puri, Rajesh et al.

International Search Report dated Jul. 29, 2016, issued in International Application No. PCT/US2016/030311 filed Apr. 29, 2016, inventor Hammer, Michael et al.

International Search Report dated Jan. 30, 2017 in corresponding PCT Application No. PCT/US2016/061894 filed Nov. 14, 2016, inventor Puri, Rajesh et al.

International Search Report dated Feb. 3, 2017, issued in International Application No. PCT/US2016/061897 filed Nov. 14, 2016, inventor Hammer, Michael et al.

International Search Report dated Apr. 25, 2017, issued in International Application No. PCT/US2017/17560 filed Feb. 10, 2017, inventor Hammer, Michael et al.

Arnedo-Moreno et al, JXTA resource access control by means of advertisement encryption, Future Generation Computer Systems 26 (2009) pp. 21-28, Elsevier.

Ford et al, Peer-to-Peer communication across network address translators, 2005, Usenix.

Supplementary European Search Report dated Feb. 5, 2018 in corresponding EP Application No. 15751839.0 filed Sep. 21, 2016, inventor Grootwassink, David et al.

* cited by examiner

SCALABLE AND ITERATIVE DEEP PACKET INSPECTION FOR COMMUNICATIONS NETWORKS

CROSS-REFERENCE TO RELATED APPLICATIONS

This application claims the benefit of U.S. Provisional Application No. 62/154,634, filed Apr. 29, 2015, which is herein incorporated by reference in its entirety.

BACKGROUND

Telecommunications service providers (SP) typically manage and monitor their networks due to regulatory requirements, and intercept and monitor voice traffic for various compliance purposes. Currently, networks include complex multi-layered systems as compared to earlier generations of networks that include simpler and relatively monolithic architectures. An aspect of current networks is a separation of application and user service delivery nodes from an underlying packet-switching data network. Another aspect of current networks is a distribution of different types of nodes between centralized home-based services and distributed visited or network access capabilities. Another aspect of current networks is legal jurisdictional boundaries and associated compliance requirements.

The effect of the architecture of current networks and the above confluence of the above aspects results in two challenges to meet compliance regulations. One challenge is that a desired traffic is buried amongst other traffic streams in larger data connections. Another challenge is that a node that controls and reports on the desired traffic may be located remotely from a desired jurisdiction.

Thus, a system and method is needed that singles out and minimizes the traffic accessed, and further directs the network to be configured such that the desired node manages compliance in the desired jurisdiction.

SUMMARY

Briefly, and in general terms, various embodiments are directed to systems and methods for scalable and iterative deep packet inspection for communication networks. According to one embodiment, a system, comprises a home network including a multimedia subsystem, a home packet data network gateway (PGW), and a home serving-call session control function (S-CSCF). The system includes a visitor network in communication with the home network over an Internetwork Packet eXchange (IPX), the visitor network having an intercept area having an intercept probe, a local packet data network gateway (PGW) and a local proxy-call session control function (P-CSCF). The system further includes a diameter edge agent that monitors and distributes signaling traffic in the visitor network sent to or received from the home network. The system also has a targeting system in communication with the diameter edge agent, where the targeting system has visibility into Diameter signaling flows, and selectively redirects the signaling traffic normally sent to the home PGW instead to the visiting PGW. An example embodiment is to divert only VoLTE traffic for a given user, but not all packet data from that user, through a local IP Multimedia Subsystem (IMS) PGW rather than to the home IMS PGW. The local IMS PGW may then send IMS signaling traffic to a local P-CSCF. In one embodiment, media bearer traffic sent through the local IMS PGW can be monitored by the intercept probe before it is delivered to the network edge Trunking Gateway (TrGW). In this example, only selected application data traffic destined to local application PGWs can selectively monitor application traffic of interest.

Other features and advantages will become apparent from the following detailed description, taken in conjunction with the accompanying drawings, which illustrate by way of example, the features of the various embodiments.

BRIEF DESCRIPTION OF THE DRAWINGS

The accompanying figures, which are included as part of the present specification, illustrate the various embodiments of the present disclosed system and method and together with the general description given above and the detailed description of the preferred embodiments given below serve to explain and the teach the principles of the present disclosure.

Figure 1:
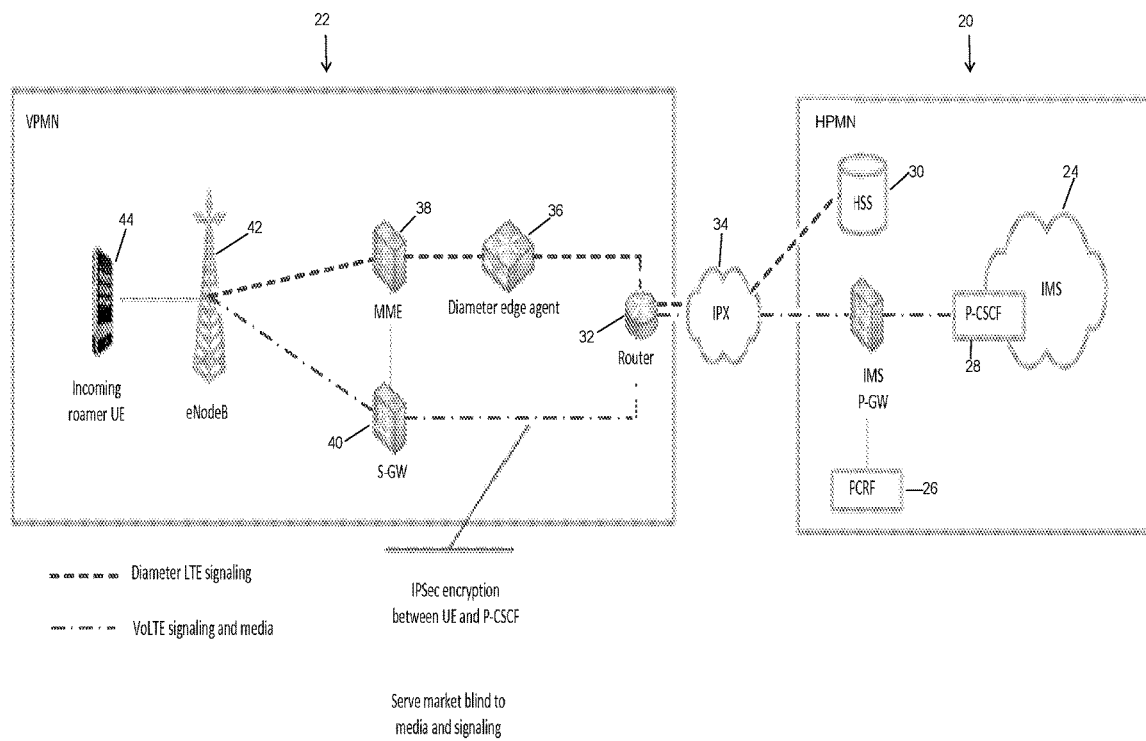
FIG. 1 an exemplary architecture of the S8 Home Routing approach, according to one embodiment.

It should be noted that the figures are not necessarily drawn to scale and elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

In one embodiment, a system and method is disclosed for discovering and separating packet traffic associated with specific user equipment (UE) in a communications network (e.g., a long-term evolution (LTE) network), and identifying and separating signaling traffic associated with domain name system (DNS), session initiation protocol (SIP), and real-time transport protocol (RTP) traffic associated with Internet Protocol (IP) multimedia subsystem (IMS) application domain traffic. In one embodiment, the system and method may include manipulating the signaling traffic to reconfigure the communications network to use voice-related service nodes in the communications network. The system and method in one embodiment further includes examining SIP signaling and SIP payloads such as session description protocol (SDP) to enable management, separation, and monitoring of selected RTP traffic (e.g., 2-way or multi-party voice and video traffic) versus other traffic (e.g., a broadcast video).

In another embodiment, the disclosed system and method intercepts VoLTE signals when a proxy-call session control function (P-CSCF) and interrogating/serving-call session control function (I/S-CSCF) services are provided by a single device without an exposed link which could be monitored. VoLTE signals include IMS signaling (SIP) and media (RTP) bearers. In a network, multiple PGWs may handle different application traffic types. The IMS PGW is the path to reach the IMS components, such as the P-CSCF or S-CSCF, which is the call session control function that does voice switching.

Each of the features and teachings disclosed herein can be utilized separately or in conjunction with other features and teachings to provide a system and method for discovering and separating packet traffic associated with specific user equipment in a communications network, and identifying and separating other protocols other than the Internet Protocol Multimedia Subsystem (IMS) application domain traffic. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particular representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known structures associated with servers, networks, displays, media handling, computers and/or processor/control systems have not been shown or described in detail to avoid unnecessarily obscuring descriptions of the embodiments.

Unless otherwise indicated, the functions described herein may be performed by executable code and instructions stored in a computer readable medium and running on one or more processor-based systems. However, state machines and/or hardwired electronic circuits may also be utilized. Further, with respect to the example processes described herein, not all of the process states need to be reached, nor do the states have to be performed in the illustrated order. Further, certain process states that are illustrated as being serially performed may be performed in parallel.

Similarly, unless expressly stated to be otherwise, while certain embodiments may refer to a computer system or data device, other computer or electronic systems may be used as well, such as, without limitation, an interactive television, a network-enabled game console, a network-enabled entertainment device, a smart phone (e.g., with an operating system and on which a user may install applications) and the like.

The terms, "for example," "e.g.," "in one/another aspect," "in one/another scenario," "in one/another version," "in some configurations" "in some implementations," "preferably," "usually," "typically," "may," and "optionally," as used herein, are intended to be used to introduce non-limiting embodiments. Unless expressly stated otherwise, while certain references are made to certain example system components or services, other components and services may be used as well and/or the example components may be combined into fewer components and/or divided into further components. The terms, "member" and "user," are used interchangeably. Members and users are subscribed to or enrolled in a network service or network of users.

According to one embodiment, the inspection system and method includes manipulating traffic changes at each network level so that a subset of traffic is diverted to a subsequent stage for further analysis and processing. At each subsequent stage, the system and method operates a smaller amount of signaling and traffic at more granular levels. For example, the present system diverts a percentage of data traffic from 100% data traffic. One embodiment of the system further selects and diverts a set of services from the diverted data traffic. Also, in one embodiment, the inspection system performs various treatments of the set of services, including treatment to voice traffic (e.g., handover), and other traffic (e.g., broadcast video).

According to one embodiment, the system allows a local regulator to perform lawful interception (LI) of voice over LTE (VoLTE) traffic on users roaming to a visited network from a foreign home network. This allows the local regulator to obtain communications network data pursuant to lawful authority for the purpose of analysis or evidence.

In the telecommunications industry, many operators advocate the S8 Home Routing approach to VoLTE roaming that does not require VoLTE support in a serving market. The S8 Home Routing approach is attractive since VoLTE networks are not ubiquitous around the world, and this eliminates testing between home and visited VoLTE networks and testing between visited VoLTE networks and different foreign home network UE types. This allows home operators to control the VoLTE service for their subscribers. However, this does not allow the serving market to perform LI on voice service for incoming roamers.

FIG. 1 illustrates an exemplary architecture of an S8 Home Routing approach. The S8 Home Routing locates all the IMS or VoLTE components in a home public mobile network (HPMN) 20, which may also be referred to as a home public land mobile network (HPLMN), as shown in FIG. 1. The visited public mobile network (VPMN) 22, which may be referred to as a visited public land mobile network (VPLMN), contains only the packet-layer network access nodes, which do not perform any voice-related processing. As shown in FIG. 1, the HPMN includes a multimedia subsystem or home IMS 24 and support nodes for policy and charging rules function (PCRF) 26, P-CSCF discovery 28, and other services. A home subscriber server (HSS) 30 also is shown in the HPMN and is a database that supports the home IMS network entities that handle calls. The HSS may contain IMPU, IMPI, IMSI, MSISDN, service triggers, and subscriber or user profiles in order to perform authentication and authorization of the subscriber, and other information.

Still referring to FIG. 1, the VPMN includes a router 32 that is in communication with the HPMN through an internetwork packet exchange (IPX) 34. The router 32 receives/sends diameter LTE signaling from/to the HSS 30 through the IPX 34, and the router receives/sends VoLTE signaling and media from/to the home IMS through the IPX. In general, communication may be initiated by VPMN and then the HPMN responds to a request. By way of example only, an Update Location Request (ULR) is initiated from the VPMN and sent to the HSS on the HPMN. Then, the HSS may respond to the VPMN with an Update Location Acknowledgement (ULA). In this example, the diameter messages sent from the VPMN to the HPMN and from the HPMN to the VPMN are monitored at the diameter edge agent monitoring point.

The diameter LTE signaling from the responding HPMN may be transferred from the router 32 to a diameter edge agent 36 and then to a mobility management entity (MME) 38. The VoLTE signaling and media is sent from the router 32 to a serving gateway (SGW) 40 that routes and forwards user data packets. Both the MME 38 and the SGW 40 support an interface with eNodeB 42, which is in communication with user equipment (UE) 44. The signaling may also originate from the UE 44 and be sent to the eNodeB 42, which transfers the diameter LTE signaling to the MME 38 or the VoLTE signaling and media to the SGW 40. The diameter LTE signaling or request from the UE is then sent to the diameter edge agent 36, which monitors the signaling, as the signaling passes to the router 32 and then to the HPMN 20. The UE can be any device used by an end user to communicate with the network, including any mobile device. There may be IPSec encryption between the UE and P-CSCF of the HPMN. However, in one embodiment, redirecting the user to a P-CSCF in the visited network means the encryption tunnel terminates at the P-CSCF in the visited network, and can be unencrypted between P-CSCF and S-CSCF in home network.

In the S8 Home Routing environment, all VoLTE calls appear as just another encrypted over-the-top application. In some jurisdictions, this violates local regulations.

According to one embodiment, the inspection system and method includes modifying signals to force a target subscriber into one of two modes that can be used for lawful intercept. Regarding a first mode, the disclosed system and method includes modifying signals to force a target subscriber on to a local packet data network gateway (PGW)/proxy-call session control function (P-CSCF) for inspection according to three requirements:

1. A roaming partner must allow for visited market P-CSCF to serve a roaming subscriber and connect back to interrogating/serving-call session control function (I/S-CSCF) in home IMS core via Internetwork packet exchange (IPX). A user may need to connect with the home S-CSCF in order to receive voice services. It is known that the home I-CSCF is used to locate the correct home S-CSCF that serves the user.

2. P-CSCF discovery must be done externally to IP multimedia services identity module (ISIM).

3. Media must be unencrypted or encrypted with SDP key exchange.

Regarding a second mode, the disclosed system and method includes eliminating IMS access point name (APN) for a target subscriber. In one embodiment, the system forces user equipment (UE) to a universal mobile telecommunications system (UMTS) switch for service via circuit switched fallback (CSFB)/single radio-voice call continuity (SRVCC) mechanisms. The present system allows lawful intercept to be performed on UMTS switch. The present system may use the second mode when the requirements of the first mode are not met.

Figure 2:
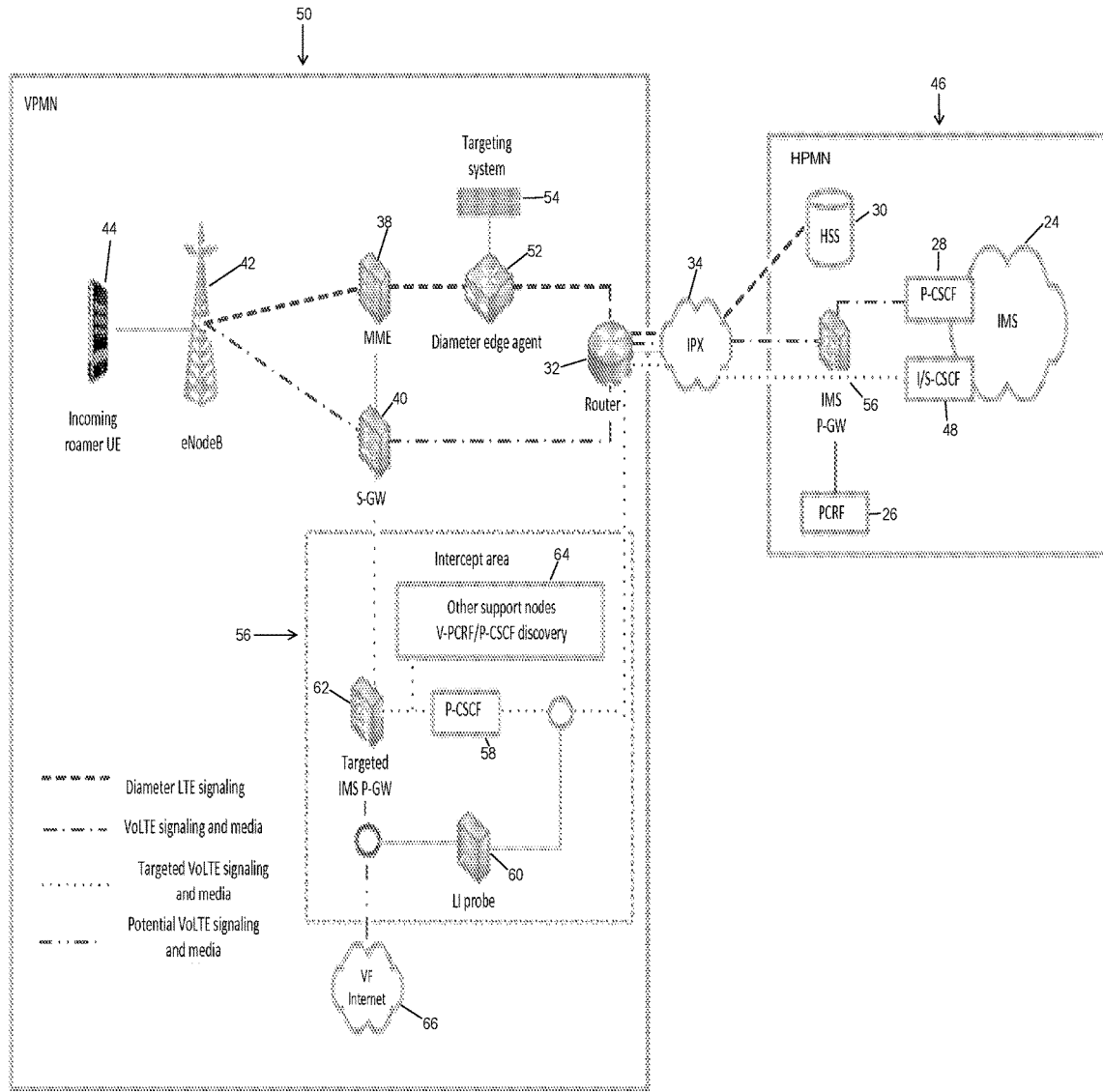
FIG. 2 illustrates an exemplary architecture of selecting and monitoring network signaling traffic, according to one embodiment.

FIG. 2 illustrates an exemplary architecture of selecting and monitoring network signaling traffic, according to one embodiment. A HPMN 46 includes similar components as the HPMN 20 shown in FIG. 1. However, HPMN 46 in FIG. 2 includes an interrogating/serving-call session control function (I/S-CSCF) 48 that sends a targeted VoLTE signaling and media through the IPX 34. Typically, the HPMN 46 sends signaling in response to a request from a user in a visited network. In certain embodiments, calls may be setup from another user to the target user, but the path taken is determined during registration of the user in the visited network.

As shown in FIG. 2, a VPMN 50 includes a diameter edge agent 52 that monitors network signaling traffic that passes through from or to the router 32. The VPMN also includes a targeting system 54 that selects network access and controls signaling to determine when to modify a network configuration so that services controlled in the home network are shifted to the local visited network. There is also an intercept area 56 that includes a visiting P-CSCF 58 and a lawful intercept probe 60. The intercept area 56 may include targeted IMS PGW 62 and other support nodes 64, such as V-PCRF. Also, in one embodiment the targeted IMS PGW 62 may be in communication with a VF Internet 66, however, in other embodiments, there is no connection to the VF Internet.

Still referring to FIG. 2, the router 32 of the VPMN 50 is in communication with the HPMN through an internetwork packet exchange (IPX) 34. The router 32 receives/sends diameter LTE signaling from/to the HSS 30 through the IPX 34, and the router receives/sends VoLTE signaling and media from/to the home IMS through the IPX. Also, the router 32 receives/sends targeted VoLTE signaling and media from/to the I/S-CSCF 48 of the HPMN 46. The diameter LTE signaling may be transferred from the router 32 to the diameter edge agent 52 and then to the mobility management entity (MME) 38. The VoLTE signaling and media may be sent from the router 32 to a serving gateway (SGW) 40 that routes and forwards user data packets. Both the MME 38 and the SGW 40 support an interface with eNodeB 42, which is in communication with a user equipment (UE) 44. The signaling may also originate from the UE 44 and be sent to the eNodeB 42, which transfers the diameter LTE signaling to the MME 38 or the VoLTE signaling and media to the SGW 40. The diameter LTE signaling or request from the UE may pass through the diameter edge agent 52, which monitors the signaling, as the signaling passes to the router 32 and then to the HPMN 46. The UE can be any device used by an end user to communicate with the network, including any mobile device. There may be IPSec encryption between the UE and P-CSCF of the HPMN. As shown in FIG. 2, the targeted VoLTE signaling and media may be directed from the router 32 to the P-CSCF 58, the other support nodes 64, the targeted IMS PGW 62 and to the SGW 40. In one embodiment, a potential VoLTE signaling and media may be sent from the targeted IMS PGW to the VF Internet 66.

Once packet data network gateway (PGW) and IMS components (e.g., proxy-call session control function (P-CSCF)) are engaged to provide service in the visited network for selected user services, the present system further monitors and extracts or minimizes traffic as desired to satisfy legal requirements. The present system and method includes the following processes and elements.

According to one embodiment, the diameter edge agent 52 is a diameter routing agent (DRA) device that reduces the complexity of inter-operator routing by consulting an external service and/or a database and modifying an information element in a passing message.

By way of example, GSMA VoLTE implementation guidelines (FCM.01) recommend that all operators use a well-known and readily identifiable access point name (APN) for IMS/VoLTE use.

According to one embodiment, the targeting system 54 is an attached/adjunct control process for the diameter edge agent 52. The target system 54 uses a ULA/ULR sequence by providing IMSI, IMEI, and mobile station international subscriber directory number (MSISDN) selectors, manipulating IEs for APN PGW Address, and manipulating P-CSCF discovery parameters that may be contained within a diameter signaling. In one embodiment, the targeting system 54 redirects the data path from the PGW in the HPMN to a PGW in the VPMN. This may be done by changing the APN for the IMPS (IMS/VoLTE) from the home location to the visiting location. As a result, the SIP/IMS protocol traffic is delivered to the visited network P-CSCF instead of the P-CSCF in the HPMN 46. If the requirements of the first mode are met, the target system 54 manipulates the APN to force targeted incoming roamers to a local breakout environment for P-CSCF and media service. If the requirements of the first mode are not met, and the roaming partner IMS platform does not allow local breakout, the target system 54 eliminates the APN, and forces them to UMTS for voice service.

In one embodiment, the targeted IMS PGW 62 in the intercept area 56 delivers IMS/SIP traffic to the P-CSCF 58. Also, the targeted IMS PGW 62 may deliver RTP traffic to media plane routers, which may be Trunking Gateways (TRGW). Further, the IMS PGW 62 may filter out any non-IMS related traffic.

In one embodiment, the P-CSCF 58 in the intercept area 56 may perform normal SIP functions in the VPMN 50. Also, the P-CSCF 58 may perform onward routing of SIP traffic through visited edge router and IPX network to the S-CSCF in the HPMN 46.

According to one embodiment, the intercept area 56 or local breakout environment contains the P-CSCF 58 along with other necessary support nodes 64 for policy and charging rules function (PCRF), P-CSCF discovery, and other services. The lawful intercept probe 60 collects information between P-CSCF and I-CSCF/S-CSCF. This allows a lawful intercept of incoming roamer VoLTE signaling that extracts secure real-time transport protocol (SRTP) media key/codec information from SDP. Since the local breakout mechanism assigns a serving market IP address to the IMS APN, VoLTE media may traverse local Internet access. The lawful intercept probe 60 collects any media packets traversing a local Internet route.

As shown in FIG. 2, the lawful intercept 60 sits on the link between the P-CSCF 58 and the S-CSCF 48 and copies and processes the IMS/SIP traffic. Further, the lawful intercept 60 is positioned on the link between the media plane (RTP voice streams) to copy and process.

In one embodiment, there may also be a trunking gateway (TRGW) that may carry the media plane traffic from visited network to home network. By way of example only, the media coming out of the targeted IMS PGW 62 in visited network exit the TRGW in the VPMN 50 and travel to the IPX 34. From the IPX 34, the media is in communication with a TRGW in the HPMN 46 and with a terminating user. In one embodiment, the terminating user media may connect to the home network via PGW and TRGW as well.

Thus, in one embodiment, the intercept system and method "forces" the use of the local breakout environment (LBO) in the visited network. As described above, in one embodiment, the targeting system 54 does the forcing through the modification of the routing information passing between the MME 38 in the VPMN 50 and the HSS/HLR 30 in the HPMN 46 as it passes through the diameter edge agent 52. The diameter edge agent 52 may be configured to route the diameter traffic through the target system 54. Then, the target system 54 checks identifiers, including IMSI, IMEI, MSISDN, in the diameter messages and determines to either relay or proxy the diameter messages. By way of example, a relayed message passes transparently, while a proxy message includes parameter substitution, such as changing the APN values as it passes through the target system 54.

In this embodiment, instead of expecting the SGW, PGW, P-CSCF, and S-CSCF to perform the lawful interception functions, the lawful intercept probe 60 extracts the SIP and RTP to tap the user traffic.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A system, comprising: a home network including a multimedia subsystem, a home packet data network gateway (PGW), and
   a home serving-call session control function (S-CSCF);
   an Internetwork packet exchange; and a visitor network in communication with the home network over the Internetwork packet exchange, the visitor network having an intercept area having an intercept probe, a local packet data network gateway (PGW) and a local proxy-call session control function (P-CSCF);
   a diameter edge agent that monitors signaling traffic in the visitor network received from the home network;
   a targeting system attached to and in communication with the diameter edge agent, wherein the targeting system redirects the signaling traffic from the home PGW to the local PGW by changing the an access point name (APN) from the home network to the visitor network;
   and the intercept probe is disposed between and in communication with the local P-CSCF and the home S-CSCF, wherein the intercept probe copies and processes the signaling traffic in the intercept area.

2. The system of claim 1, wherein the targeting system delivers the signaling traffic to the local PGW.

3. The system of claim 2, wherein the local PGW delivers the signaling traffic to the local P-CSCF.

4. The system of claim 3, wherein the local PGW delivers real-time transport protocol (RTP) to media plane routers.

5. The system of claim 4, wherein the local PGW filters out non-multimedia subsystem (IMS) related signaling or media traffic.

6. The system of claim 1, wherein the local P-CSCF performs session initiation protocol (SIP) functions in the visitor network.

7. The system of claim 1, wherein the intercept probe is disposed between and in communication with a real-time transport protocol (RTP) voice streams and copies and processes the RTP voice streams.

8. The system of claim 1, wherein the intercept probe is disposed between and in communication with the local PGW and a Trunking Gateway, wherein the intercept probe copies and processes the media traffic in the intercept area.

9. A method, comprising: monitoring, with a diameter edge agent device, signaling traffic passing between a mobility management entity in a visiting network and a home subscriber server in a home network;
   routing, with the diameter edge agent device in the visiting network, the signaling traffic to a targeting system attached to the diameter edge agent device;
   routing, with the targeting system, the signaling traffic to an inspection area of a visitor network by a first mode or a second mode,
   wherein the first mode includes relaying the signaling traffic to the inspection area of the visitor network and the second mode includes modifying routing information of the signaling traffic;
   inspecting, with an inspection probe disposed in the inspection area of the visitor network, the signaling traffic; and
   copying and processing, with an intercept probe, the signaling traffic in an intercept area, wherein the intercept probe is disposed between and in communication a local proxy-call session control function (P-CSCF) and a home serving-call session control function (S-CSCF) of the home network.

10. The method of claim 9, wherein the targeting system inspects identifiers in the signaling traffic and determines if the signaling traffic will be routed by the first mode or the second mode.

11. The method of claim 10, wherein routing the signaling traffic includes routing the signaling traffic by the first mode.

12. The method of claim 11, wherein routing the signaling traffic by the second mode when a requirement is not met.

13. The method of claim 9, further comprising enabling, via an access point name (APN), the visitor network to connect a visiting user to a home network, such that the targeting system routes the signaling traffic from a visiting packet data network gateway (PGW) of the visitor network to a home packet data network gateway (PGW) of the home network.

14. The method of claim 13, wherein the targeting system routes signaling traffic to the visiting PGW in the second mode by changing the APN from the home network to the visitor network.

* * * * *